(No Model.)
J. F. IVES & F. B. COLMAN.
VALVE FOR PNEUMATIC TIRES.
No. 481,762. Patented Aug. 30, 1892.
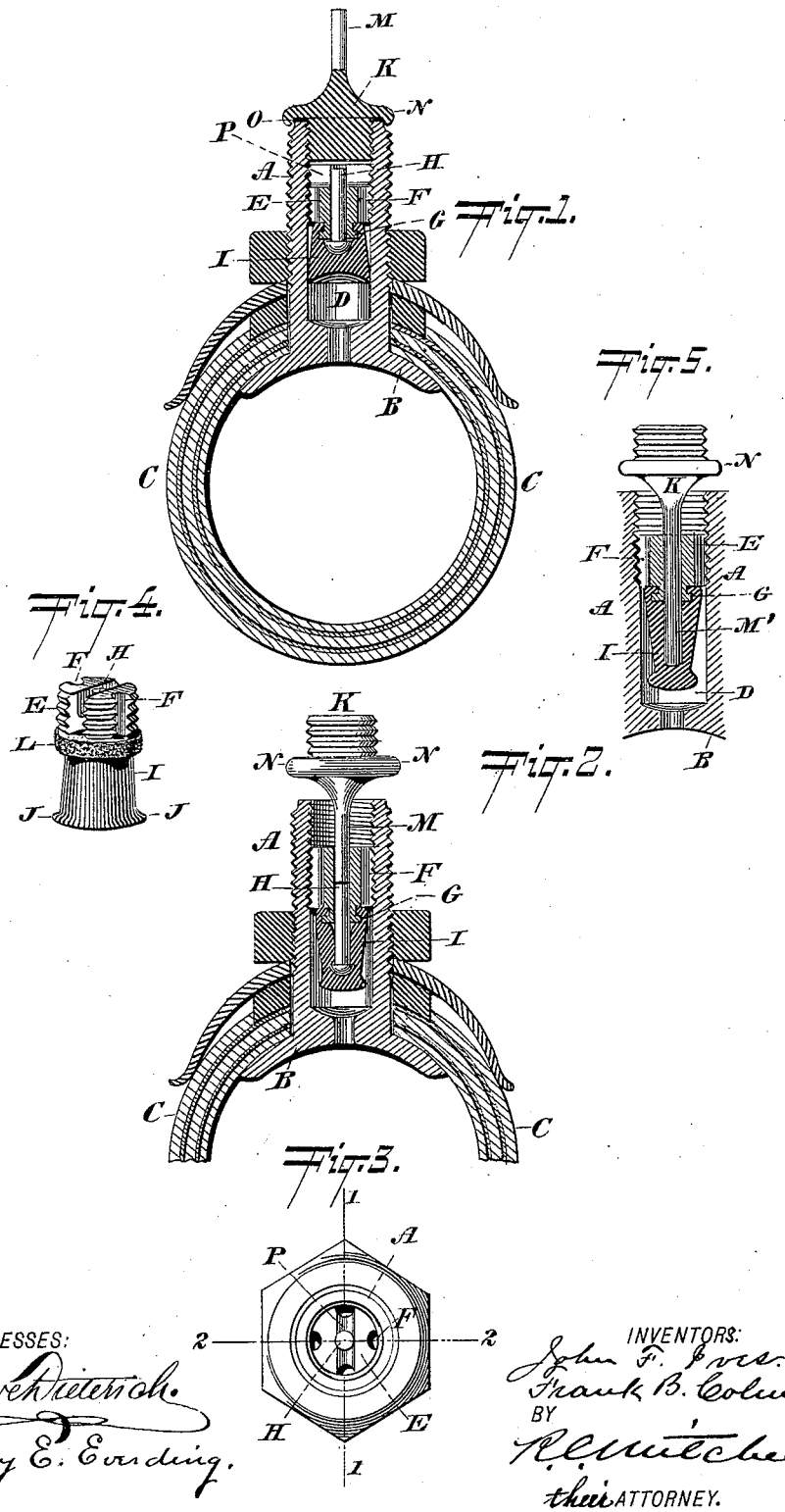

UNITED STATES PATENT OFFICE.

JOHN F. IVES AND FRANK B. COLMAN, OF NEW YORK, N. Y.

VALVE FOR PNEUMATIC TIRES.

SPECIFICATION forming part of Letters Patent No. 481,762, dated August 30, 1892.

Application filed May 4, 1892. Serial No. 431,842. (No model.)

*To all whom it may concern:*

Be it known that we, JOHN F. IVES and FRANK B. COLMAN, citizens of the United States, residing at New York, in the county and State of New York, have invented a new and useful Improvement in Valves, of which the following is a full, clear, and exact specification.

Our invention relates to an improved valve particularly adaptable to pneumatic bicycle-tires; and it consists in the novel construction hereinafter fully shown and described.

The object our invention is to provide a simple and effective valve that will permit the introduction of air or liquid and automatically operate to prevent the escape of the same until desired.

Our invention is illustrated by the accompanying drawings, in which—

Figure 1 is a longitudinal cross-section of the valve as applied to a pneumatic bicycle-tire, showing the same in operation. Fig. 2 is a similar view showing the valve mechanism in position to permit the escape of the air. Fig. 3 is a plan view of the valve mechanism with the capping-piece removed. Fig. 4 is a perspective view of one of the details slightly modified, and Fig. 5 is a longitudinal cross-section of a modification of the valve.

As this valve is particularly adaptable to pneumatic bicycle-tires, we have illustrated and will describe it as used in connection with such a tire.

A is a valve-stem proper, preferably cylindrical in form.

B is an extension at the lower end to furnish a means of fastening the valve-stem to the tire C. The interior of the stem has a substantially cylindrical chamber D extending through the said stem A, the lower part of which chamber may be contracted, as shown in the drawings, to form a small air-inlet into the tire. This chamber may be screw-threaded on its inside for a suitable distance, as indicated in Figs. 1 and 2. The lower part of this chamber D is preferably left smooth, for the reason hereinafter stated.

E is a shank (see Fig. 4) having longitudinal recesses F F in its sides and adapted to be secured to the walls of the chamber D by screw or other connection. At one end of this shank is formed by preference a collar or other projection having an outwardly-extending shoulder G. Through a central longitudinal perforation in this shank runs by preference a plunger H, preferably headed at its lower end. A cap I, of rubber or other similar substance, is by preference fitted over the shoulder G and is thereby held to the shank. The shank E is screwed into the partially-threaded chamber D until the cap I is preferably entirely within the smooth sides of the cylindrical chamber, as shown in Fig. 1. A lip J, Fig. 4, may be formed on the cap I to bear snugly against the walls of the chamber D. It will now be seen that air may be forced past the cap I into the tire through the valve-stem A from one direction; but as soon as there is any return pressure the rubber cap I will be forced against the shank E and thereby compressed or longitudinally flattened, and its sides will therefore be forced against the wall of the chamber D, securely choking the passage and preventing the return passage of the air. It will be seen, also, that as the pressure within the tire increases the rubber cap I is correspondingly more compressed and the joints between the rubber cap and the chamber D is rendered more effective. To permit the deflation of the tire, the plunger H, carried in a longitudinal perforation in the shank and bearing against the inner side of the rubber cap, is depressed, as indicated in Fig. 2, thereby elongating the cap I and decreasing the diameter of said cap to an extent that will permit the air contained within the tire C to pass by and out. Fitted to the upper part of the valve-stem A is a screw-threaded cap K, having at its upper end a projection or pin M of substantially the same diameter as the diameter of the plunger H. This cap K has preferably an overhanging shoulder N, which retains a suitable washer O, of lead, leather, or other suitable substance, (see Fig. 1,) the object of this washer being to make a more perfect joint between the cap and the valve-stem A, thereby increasing the efficiency of the valve. This is not necessary, however, for experiment has demonstrated that the rubber cap I, as described, makes as near as possible an air-tight joint. We preferably form a groove or recess P in the upper end of the shank E to admit a small screw-driver, whereby the shank may be unscrewed and removed from the stem.

Fig. 4 illustrates a modification of the shank E and cap I, in which a washer L, of felt, sponge, or other absorbing material, is inserted between the shank E and the cap I, for the following reason: Oil is sometimes used in the air-pump used to inflate the tire and frequently is pumped into the valve along with the air, and as oil has an injurious effect on rubber we therefore insert this washer L to absorb such oil as may be present. These washers and caps may be renewed by simply removing the cap I and substituting a new washer and slipping a new cap over the shoulder G of the shank E.

The advantages of the cap K with the projection M are twofold. When in the position shown in Fig. 1, it increases the efficiency of the valve, and when removed and in the position shown in Fig. 2 the projection M may be used to operate the plunger H, thereby permitting the deflation of the tire, the presence at all times of this projection M being of great advantage.

The modification shown in Fig. 5 illustrates our invention minus the plunger. It is obvious that the pin projection M' may be sufficiently long to be inserted through the longitudinal perforation in the shank and the rubber cap thereby depressed when it is necessary to deflate the tire.

Having thus described our invention, what we claim, and desire to obtain by Letters Patent, is—

1. A valve consisting of an inflexible or metallic shank carrying a flexible cap, in combination with a hollow valve-stem, said flexible cap normally closing said valve-stem and being adapted to be distended to open said valve-stem, substantially as described.

2. In a valve, the combination of the hollow stem A, with the flexible cap I contained therein, and the plunger H, substantially as described.

3. In an automatic valve, the combination of the valve-stem A, with the shank E, carrying the plunger H, and with a flexible cap I, adapted to be elongated by the plunger H to open said valve, substantially as described.

4. In an automatic valve, the combination of the valve-stem A, the shank E, having longitudinal grooves F F and carrying the flexible cap I, adapted to normally close the valve, and with the plunger H, carried by the shank E, adapted to overcome the normal tendency of the flexible cap I, substantially as described.

5. In an automatic valve, the combination of the valve-stem A, the grooved or perforated shank E, with the plunger H, the flexible cap I, and the washer L of absorptive material, all arranged substantially as described.

6. In an automatic valve, the hollow stem partially threaded internally, the therein-contained valve mechanism, as described, with the cap K, adapted to fit to the upper end of the valve-stem and having the projection M of substantially the same diameter as the plunger H, substantially as and for the purpose described.

7. In an automatic valve, the valve-stem A, the shank E, carrying the plunger H, and the flexible cap I, having the outwardly-projecting lip J to more closely contact with the sides of the hollow stem A, all arranged to normally permit the passage of air through the stem in one direction and check its return in the opposite direction, substantially as described.

JOHN F. IVES.
FRANK B. COLMAN.

Witnesses:
H. M. SKINNER,
FREDERICK SCHLESINGER.